US008824682B2

(12) United States Patent
Hyppönen

(10) Patent No.: US 8,824,682 B2
(45) Date of Patent: Sep. 2, 2014

(54) METHOD AND SYSTEM FOR BACKING UP ENCRYPTION KEY GENERATED ON COMPUTER DEVICE AND ACCESSING ENCRYPTED INFORMATION STORED ON COMPUTER DEVICE

(75) Inventor: Ari Hyppönen, Helsinki (FI)

(73) Assignee: F-Secure Oyj, Helsinki (FI)

( * ) Notice: Subject to any disclaimer, the term of this patent is extended or adjusted under 35 U.S.C. 154(b) by 2272 days.

(21) Appl. No.: 10/398,753

(22) PCT Filed: Aug. 20, 2001

(86) PCT No.: PCT/EP01/09645
§ 371 (c)(1),
(2), (4) Date: Jun. 10, 2003

(87) PCT Pub. No.: WO02/32046
PCT Pub. Date: Apr. 18, 2002

(65) Prior Publication Data
US 2003/0185398 A1    Oct. 2, 2003

(30) Foreign Application Priority Data
Oct. 10, 2000    (GB) .................................. 0024764.3

(51) Int. Cl.
*H04L 9/08*    (2006.01)
*G06F 21/79*    (2013.01)

(52) U.S. Cl.
CPC .............. *H04L 9/0894* (2013.01); *G06F 21/79* (2013.01); *H04L 9/0822* (2013.01)
USPC .......................................... 380/277; 380/286

(58) Field of Classification Search
USPC ....................................................... 380/277
See application file for complete search history.

(56) References Cited

U.S. PATENT DOCUMENTS 4,441,095 A * 4/1984 Widmer et al. .................. 380/28
5,425,103 A * 6/1995 Shaw ............................... 380/44
(Continued)

FOREIGN PATENT DOCUMENTS

DE    219319 A1    2/1985
GB    2237954       5/1991

OTHER PUBLICATIONS

Applied Cryptography, ISBN: 0-471-11709-9, by B Schneier, 2$^{nd}$ edition, copyright 1996.*

(Continued)

*Primary Examiner* — Jason K. Gee
*Assistant Examiner* — Zhimei Zhu
(74) *Attorney, Agent, or Firm* — Squire Patton Boggs (US) LLP

(57) ABSTRACT

A method of enabling a user of a computer device to back-up an encryption key generated on the device, where the key is used to encrypt stored data, and the key is itself encrypted using a user password for storage on the device. The method comprises rendering the key into a form comprising a reduced length sequence of characters and displaying the reduced length sequence on a display of the device. The user is then able to write down the rendered key. The reduced length sequence may also be sent to a service provider in an SMS message, e-mail, or by voice dictation. In the event that the user password is lost, such that the encrypted key stored on the device cannot be unencrypted, encrypted data may still be accessed by the user entering the rendered key into the device.

17 Claims, 3 Drawing Sheets

(56) References Cited

U.S. PATENT DOCUMENTS

| | | | |
|---|---|---|---|
| 5,457,748 A | 10/1995 | Bergum et al. | |
| 5,623,546 A | 4/1997 | Hardy et al. | |
| 5,774,551 A * | 6/1998 | Wu et al. | 713/155 |
| 5,802,175 A | 9/1998 | Kara | |
| 6,044,155 A * | 3/2000 | Thomlinson et al. | 713/155 |
| 6,052,468 A * | 4/2000 | Hillhouse | 380/281 |
| 6,105,012 A * | 8/2000 | Chang et al. | 705/64 |
| 6,122,375 A * | 9/2000 | Takaragi et al. | 380/28 |
| 6,160,891 A * | 12/2000 | Al-Salqan | 380/286 |
| 6,185,308 B1 * | 2/2001 | Ando et al. | 380/286 |
| 6,236,729 B1 * | 5/2001 | Takaragi et al. | 380/286 |
| 6,266,421 B1 * | 7/2001 | Domyo et al. | 380/286 |
| 6,272,225 B1 * | 8/2001 | Miyauchi et al. | 380/286 |
| 6,549,626 B1 * | 4/2003 | Al-Salqan | 380/286 |
| 6,662,299 B1 * | 12/2003 | Price, III | 713/171 |
| 6,738,907 B1 * | 5/2004 | Carter | 726/9 |
| 6,754,349 B1 * | 6/2004 | Arthan | 380/286 |
| 6,760,843 B1 * | 7/2004 | Carter | 726/10 |
| 6,775,382 B1 * | 8/2004 | Al-Salqan | 380/286 |
| 6,792,112 B1 * | 9/2004 | Campbell et al. | 380/270 |
| 6,831,982 B1 * | 12/2004 | Hughes et al. | 380/281 |
| 6,947,556 B1 * | 9/2005 | Matyas et al. | 380/29 |
| 7,051,213 B1 * | 5/2006 | Kobayashi et al. | 713/194 |
| 7,330,970 B1 * | 2/2008 | Field | 713/165 |
| 7,334,126 B1 * | 2/2008 | Gilmore et al. | 713/168 |

OTHER PUBLICATIONS

"Codes, trees and the prefix property," Macphee, Jan. 1, 2000.*
"The Art of Assembly Language Programming," Randall Hyde, Chapter One: Data Representation (part3), Sep. 26, 1996.*
"Binary Numbers," John Rieman, Sep. 1996.*
Guttman et al., Network Working Group Request for Comments: 2504, Users' Security Handbook [online], Feb. 1999 [retrieved on Apr. 7, 2014]. Retrieved from the Internet<URL: http://www.rfc-base.org/txt/rfc-2504.txt>.*

* cited by examiner

METHOD AND SYSTEM FOR BACKING UP ENCRYPTION KEY GENERATED ON COMPUTER DEVICE AND ACCESSING ENCRYPTED INFORMATION STORED ON COMPUTER DEVICE

The present invention is related to encryption, and in particular to methods for recovering encrypted data if an encryption password is lost or forgotten.

Users of desk top computers and similar devices frequently need to store confidential information on their systems. As "smart" mobile phones and communicators become more widely used, there is a growing need for these devices also to be able to store confidential information. To keep such information safe, it needs to be encrypted.

In some encryption systems, a password or pass phrase is provided by the user, and this password is used by the system to encrypt the confidential information. Ideally, for ease of use, the user should only have to remember one password to make all the documents in the system available. It is recommended that the password is changed on a regular basis to make it more difficult for an attacker to guess it. However, a change in the password results in all the documents being re-encrypted, consuming a lot of processing time.

As a solution to this problem, an encryption system has been proposed which uses a two-level architecture. In this architecture, the password is not used to encrypt documents directly. Instead, the password is used to encrypt a much longer binary encryption key which is in turn used to encrypt the documents. When the password changes, only the binary encryption key needs to be re-encrypted. The documents which are encrypted with the binary encryption key do not need to be changed.

This architecture still relies however upon a user remembering the password. If the password is forgotten or lost, the user is unable to access his data. In the case of desktop computers and other computing devices with access to floppy disks or other removable storage devices, this problem can be mitigated by allowing the binary encryption key to be backed up onto a floppy disk, which should be kept safe by the user. If the password is then forgotten, the encrypted data can be accessed if the user inserts the floppy disk containing the binary encryption key. The user will then have the opportunity to choose a new short password and access the encrypted data.

Many mobile devices such as mobile phones and communicators do not have access to floppy disks. The solution described above will therefore not be applicable to such devices.

It is an object of the present invention to provide a method for backing up an encryption key on a computer device which does not necessarily have access to removable memory storage media.

According to a first aspect, the present invention provides a method of enabling a user of a computer device to back-up an encryption key generated on the device, the method comprising rendering the key into a form comprising a reduced length sequence of characters and displaying the reduced length sequence on a display of the device.

This makes it possible for a user to write down a rendered version of the binary encryption key used in a two-level encryption architecture as described above, i.e. where the encryption key is itself encrypted using a short password or passphrase for storage in a memory of the device. If the password is lost, the encryption key can be restored by keying in the rendered version as written down. The user may then choose a new password to replace the forgotten one, and continue accessing the encrypted documents.

The encryption key may be rendered into a form comprising ASCII characters.

According to a second aspect, the present invention provides a method of enabling a user of a computer device to back-up an encryption key generated on the device, the method comprising rendering the key into a form comprising a reduced length sequence of characters and sending the reduced length sequence to a service provider.

In one embodiment of the invention, a copy of the rendered version of the encryption key may be sent to a service provider as a text message, (e.g. using the GSM Short Messaging Service) or similar, or may be given to the service provider by voice dictation over the telephone. In an alternative embodiment, the rendered key may be sent to the service provider in an e-mail. The service provider keeps such rendered encryption keys in a safe place. If the password is forgotten, the user can contact the service provider, who, after authenticating the user, can then communicate the rendered key on the phone to the user, who can enter it into the device to regain access to the confidential information. Alternatively, the provider may send the rendered encryption key directly to the computer device as a text message via SMS or similar.

The computer device may be one of a mobile telephone, communicator, PDA or PC.

In a preferred embodiment of the invention, there is provided a method of encrypting information on a computer device, comprising generating an encryption key, rendering the encryption key into a form which can be displayed as text, displaying the rendered encryption key so that it can be written down by a user of the computer device, encrypting the information using the encryption key, and storing the encryption key in a memory of the device in a form which is encrypted using a user password.

If the rendered encryption key is sent to a service provider, the user of the computer device may be given the opportunity to provide identification information to the service provider, e.g. via a WAP or WWW page.

A checksum is preferably generated from the encryption key and stored on the computer device so that, in the event that the user needs to enter the encryption key to regain access to encrypted information if he forgets his password, the checksum of the entered encryption key can be checked against the stored checksum to determine whether or not the encryption key has been entered correctly.

The rendered encryption key is preferably deleted from the memory of the computer device once it has been displayed to the user and/or sent to the service provider.

If the user forgets his password, in a preferred embodiment of the invention there is provided a method of accessing encrypted information stored on a computer device, comprising entering a rendered encryption key into the computer device, decoding the rendered encryption key to generate a binary encryption key, and unencrypting the encrypted information using the binary encryption key.

The rendered encryption key may be entered using a keypad of the device, or by means of a text message received from a service provider.

For a better understanding of the present invention and in order to show how the same may be carried into effect reference will now be made, by way of example, to the accompanying drawings, in which.

Figure 1:
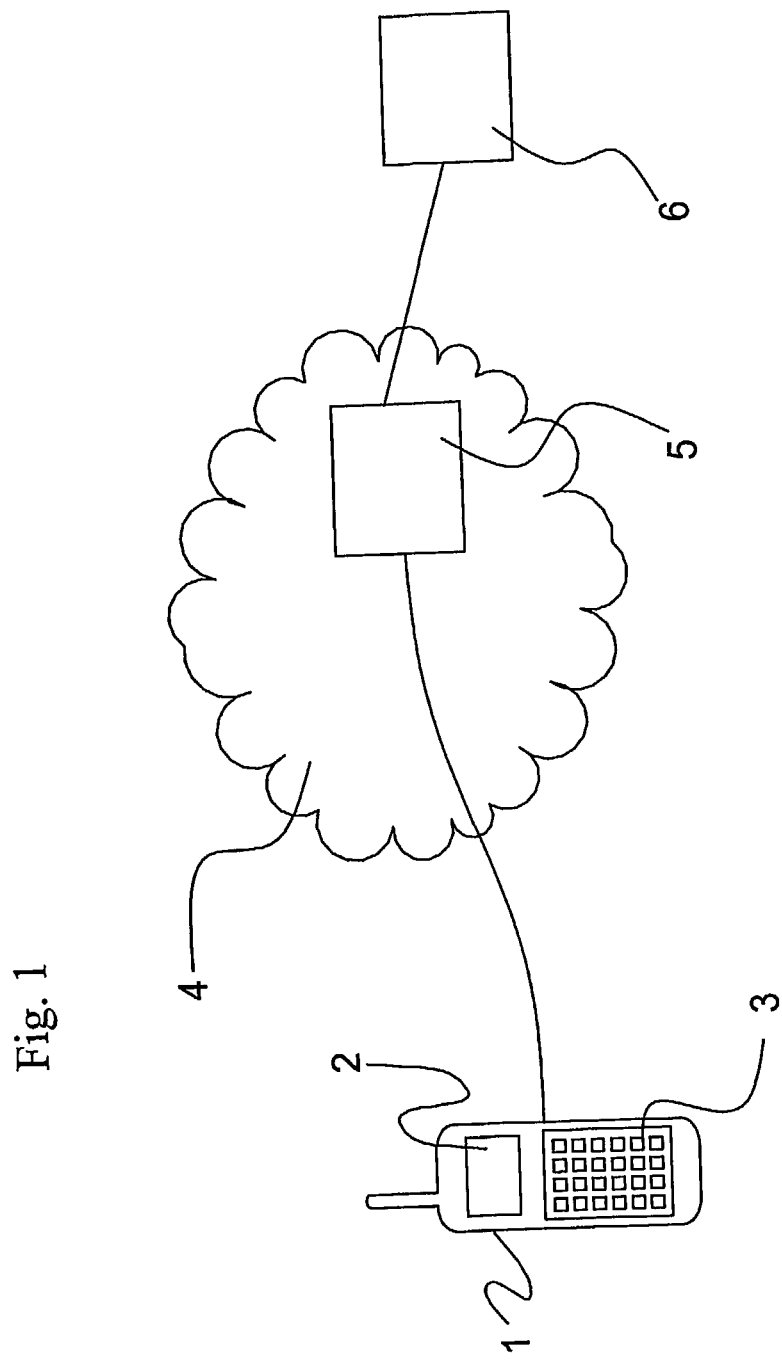
FIG. 1 is a schematic representation of a computer device together with means for backing up an encryption key.

FIG. 1 shows a mobile wireless terminal 1 subscribed to a Global System for Mobile telecommunciations (GSM) network 4. The mobile wireless terminal comprises a display screen 2, typically in the form of an LCD, and a keypad 3. Short text messages can be sent via a signalling channel using the Short Messaging Service (SMS) provided by the GSM operator. SMS messages may for example be transmitted to the server 6 of a service provider via an SMS messaging centre 5 of the GSM network 4.

Figure 2:
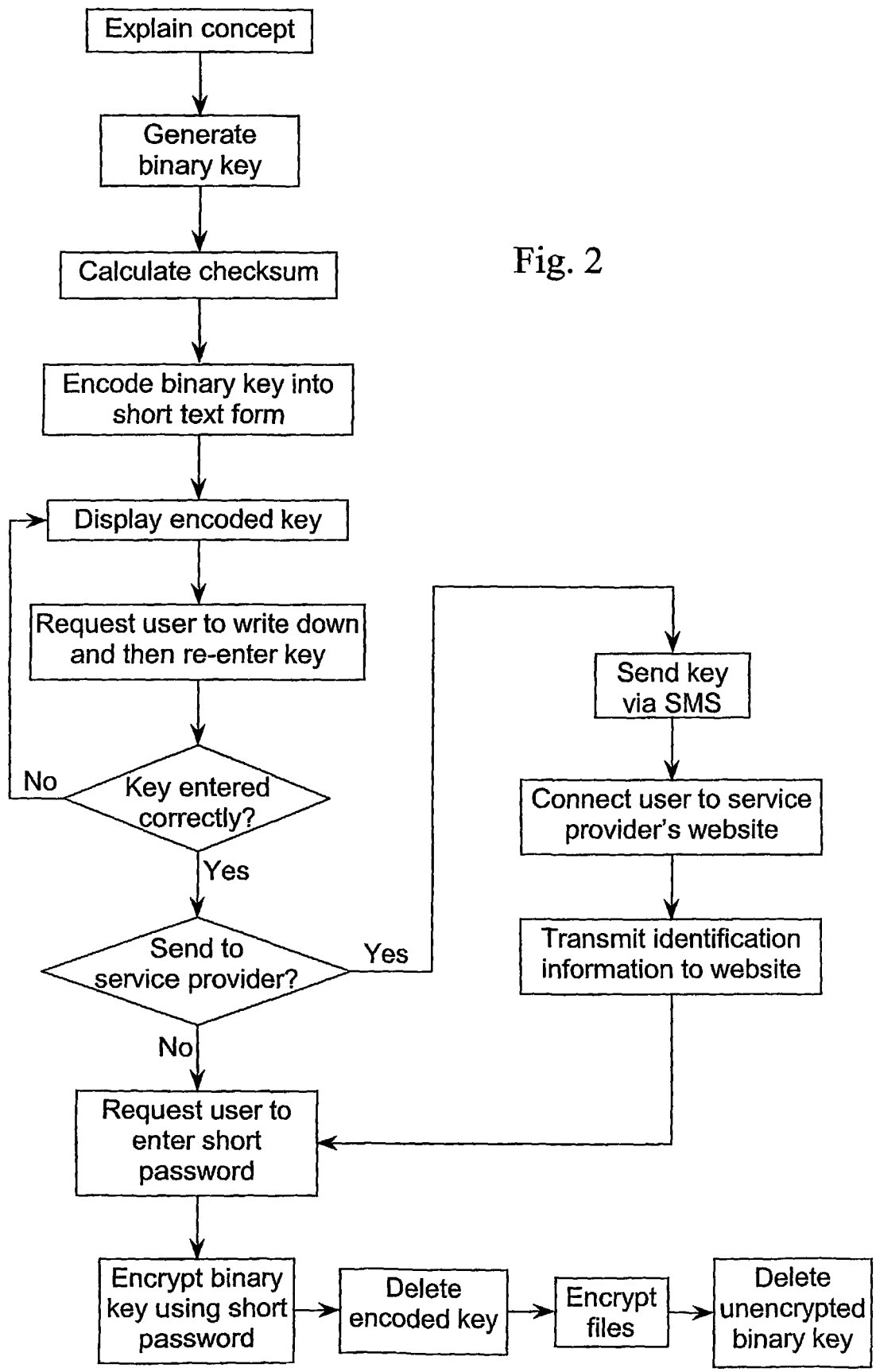
FIG. 2 is a flow diagram showing the sequence of events when encrypting information on a computer device.

FIG. 2 is a flow diagram showing the sequence of events when encrypting information on a computer device such as a mobile phone or communicator.

Encryption software may be provided with a new computer device, or may be bought at a later stage and installed. In either case, when the software is used for the first time a "set-up" phase is entered. The user is asked if any confidential files stored in the system should be protected through encryption. If this is what the user wants, a sequence of dialog boxes is presented which walk the user through the necessary steps in the key generation, password selection, key backup, and encryption processes.

1. A welcome screen explains the basic concepts of the encryption system and why it is necessary to go through the subsequent steps.
2. A binary encryption key is generated. This may be done by generating random numbers within the computer.
3. The system calculates a cryptographic checksum of the binary encryption key and stores it in the system.
4. The user is told that he will need to write the encryption key down (for example on a card provided with the device by the manufacturer), and to keep this card in a safe place. He is also told that he also has the option of sending the key to a service provider through SMS for additional safety.
5. The binary encryption key is rendered into a human readable version, and displayed to the user as a sequence of ASCII characters. The method for rendering the encryption key to a human readable version is described below. The user is asked to write down the displayed ASCII version of the encryption.
6. When the user acknowledges that the key has been written down, he is asked to re-enter it on the keyboard or other input device in order to ensure that it has been written down correctly. If the rendered encryption key entered by the user does not match the rendered encryption key held by the device, the user is informed that there is an error and is requested to re-enter the key into the device. The user has the option of returning to the previous step.
7. If the user wants to send the key to a service provider for additional safety, the same human readable version of the key is sent as an SMS text message. The SMS message may also contain information in the header identifying the fact that the payload of the message contains a rendered version of a binary encryption key, and identifying the user. The user may also be taken to a WAP or web page to enter a number of question/answer pairs which can later be used to check the user's identity.
8. The user is asked to choose a short password (e.g. eight characters) to access the system, and to re-enter it to confirm it.
9. The binary encryption key is encrypted with the user's password and stored in the device's memory. The human readable ASCII version is deleted from the device's memory.
10. The confidential documents in the system are encrypted with the (unencrypted) binary encryption key which is then also deleted from the device's memory and the system is ready for use.

It will be appreciated that the rendered key could also be sent to the service provider by dictation over the telephone.

Figure 3:
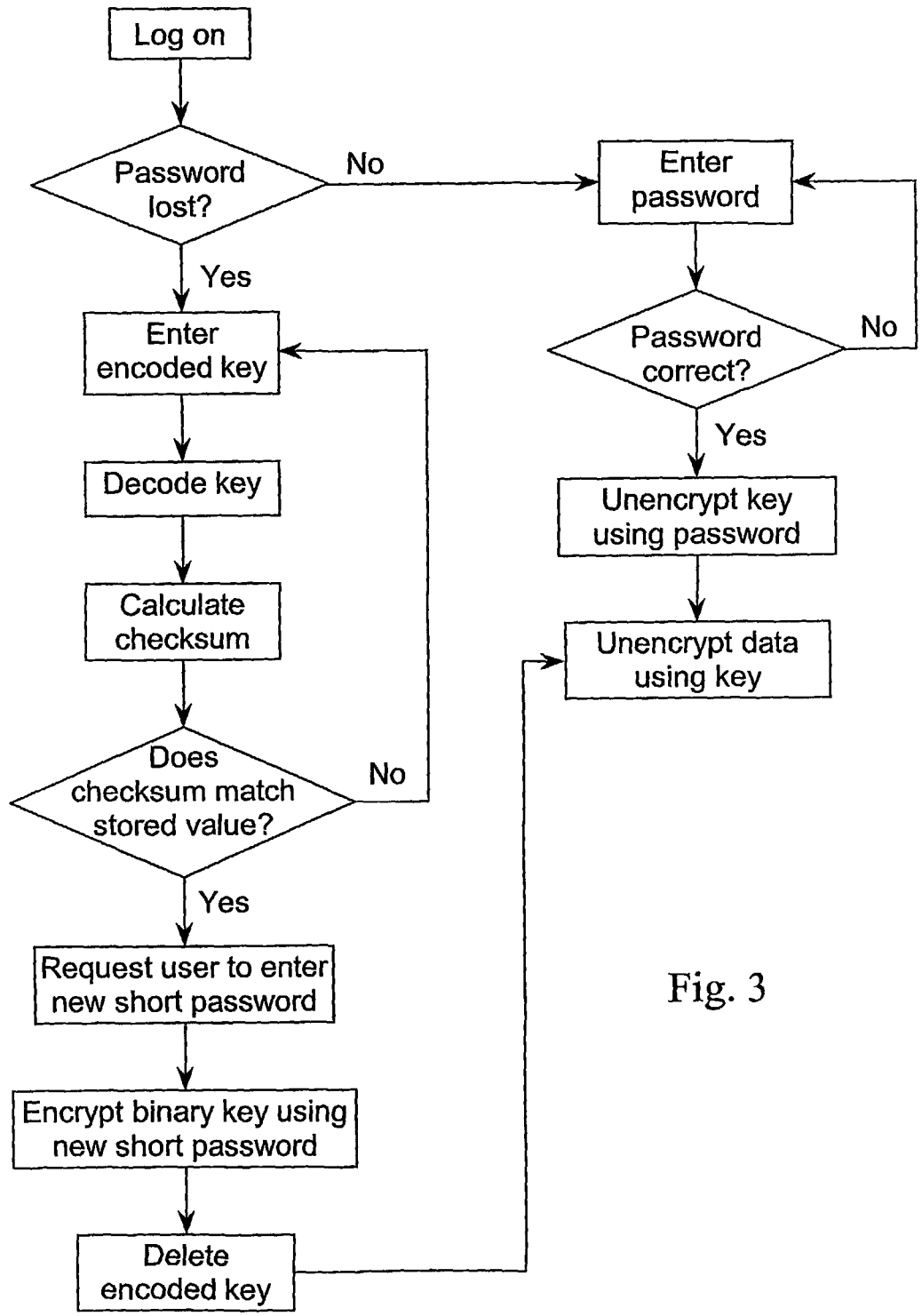
FIG. 3 is a flow diagram showing the sequence of events when accessing encrypted information on a computer device.

FIG. 3 is a flow diagram showing the sequence of events for accessing encrypted information on the device.

When the user opens the system, a login dialog box is shown. The dialog box contains a text edit field for the password and three buttons in the dialog box: <OK>, <Switch off>, and <Lost password . . . >. If the user knows the password, he can enter it into the text edit field and click <OK>. The device then unencrypts the key using the password, and unencrypts the encrypted files using the key.

If the password has been lost or forgotten, the user presses the <Lost password . . . > button, causing a sequence of dialog boxes to be presented which walls the user through the necessary steps in the recovery process.

1. The first dialog box explains that there is no way to recover the password, but that access to the information can still be restored provided that the backup copy of the binary encryption key is available.
2. The user is asked to find the card where the human readable version of the binary encryption key was written down. A small scale picture of the card may be shown as well if the display device is capable of this.
3. If the system recognizes that the backup key was also sent to a service provider through an SMS text message, the user is told that if the card is not handy, the user can also call the service provider on the phone to ask them for the key backup. The user may be shown an address of a web page at which can be found a list of service provider telephone numbers.
4. If the user calls the service provider, the service provider checks the identity of the user with the set of question/answer pairs prepared during the setup of the encryption system, or some other means. The service provider then finds the human readable ASCII version of the backup of the binary encryption key.
5. The user enters the human readable version of the binary encryption key to the device from the paper it was written down, or by following the instructions of the service provider on the phone.
6. The system decodes the human readable version to the binary encryption key, and calculates a cryptographic checksum of that key. The checksum is compared with the checksum that was stored in the device during the initial setup of the system.
7. If the two checksums don't match, the user is told that the key has been entered incorrectly. The user is returned to step 5.
8. If the two checksums match, the user is asked to enter a new short password to access the system, and to re-enter it to confirm it.
9. The binary encryption key is encrypted with the user's new short password, and the newly encrypted binary key replaces the previous encrypted binary key stored in the device. The human readable version and unencrypted binary key are deleted from the device's memory. The system is ready for use.

The login dialog box may also contain a message giving contact details of the owner of the device so that, if the device has been lost and been switched on by someone other than the owner, it can be returned to the owner.

It will be appreciated that if the human readable ASCII version of the encryption key has been sent to a service provider it can be returned directly from the service provider to the computer device via an SMS message or similar, rather than being dictated over the telephone for the user to manually enter it himself. Receipt of the SMS message may automatically trigger the reinstallation of the encryption key, or the user may enter the rendered key by reading the displayed text message and entering the text.

A suitable method for encoding a binary encryption key to human readable format will now be described. The method uses the following 32 alphabetical characters:

0123456789ABCDEFGHJKLMNPRSTUWXYZ

It should be noted that letters which may easily be mistaken with numbers, "I", "O" and "Q", have been omitted.

Since 32 distinct values can be represented by binary numbers in the range 00000-11111, the binary encryption key is divided into N groups of five bits each. Each group from 1 to N will be represented with one of the characters as follows:

| Binary group | Character |
|---|---|
| 00000 | 0 |
| 00001 | 1 |
| 00010 | 2 |
| 00011 | 3 |
| 00100 | 4 |
| 00101 | 5 |
| 00110 | 6 |
| 00111 | 7 |
| 01000 | 8 |
| 01001 | 9 |
| 01010 | A |
| 01011 | B |
| 01100 | C |
| 01101 | D |
| 01110 | E |
| 01111 | F |
| 10000 | G |
| 10001 | H |
| 10010 | J |
| 10011 | K |
| 10100 | L |
| 10101 | M |
| 10110 | P |
| 10111 | R |
| 11000 | S |
| 11001 | T |
| 11010 | U |
| 11011 | V |
| 11100 | W |
| 11101 | X |
| 11110 | Y |
| 11111 | Z |

This covers all possible binary groups of five bits. A typical binary encryption key will include between 40 and 256 bits, although it will be understood that any number may be used. Encryption keys whose length cannot be evenly divided into groups of five bits are padded with zeros at the end. For example, encryption keys of 128 bits are padded with two zero bits at the end to obtain a 130-bit key that can be rendered into 26 characters, each of which represents five bits of the encryption key. The length of the encryption key is known to the system so the extra bits can be removed during decoding.

For readability, the characters are grouped into groups of four, separated by dashes. The final human readable representation of a 128-bit binary encryption key could therefore look like this:

VCZ4-X21J-FWL6-Y5T2-REW6-DA5C-ZL

The total length of the human readable version of the 128-bit binary encryption key is thus 32 characters, including the dashes.

In order to decode a human readable version back to a binary encryption key, the same method is employed in reverse. For each character, the corresponding binary group is chosen, and these are concatenated together.

Since the user may mistake the number 1 for the letter I, or the number 0 for the letter O or the letter Q, the system will replace these letters with the corresponding numbers as the user enters the key back to the system.

The length of the encryption key is known to the system, so any extra padding zero bits can be removed from the end of the key before proceeding.

It will be appreciated that various modifications may be made to the above described embodiments without departing from the scope of the present invention.

Although the above description describes a system with two-level architecture comprising a password or pass phrase which is used to encrypt an encryption key, it will be appreciated that the invention can be used in systems with higher level architecture. For example, in order to protect against known "plain text attack" (in which an attacker has knowledge of one file stored on a computer device, and by comparison of the file with the encrypted version is able to determine the encryption key, which can then be used to unencrypt all files) a further file-specific encryption key may be used in addition to the universal encryption key described above. Each file has a unique encryption key assigned to it, and is encrypted using this file-specific encryption key. The file-specific encryption key is then encrypted using the universal encryption key, and saved in the header of the file. When it is required to unencrypt a file, the universal encryption key is used to unencrypt the header of the file, releasing the unique encryption key specific to that file, which is then used to unencrypt the file.

The invention claimed is:

1. A method of enabling a user of a computer device to back-up an encryption key generated on the device, the method comprising rendering the key into a form comprising a reduced length sequence of characters and displaying the reduced length sequence on a display of the device.

2. A method according to claim 1 and comprising:
   encrypting other data stored in the device using the encryption key; and
   storing the encryption key on the device in a form encrypted using a user password.

3. A method as claimed in claim 2 and comprising deleting both the original and the rendered encryption key from the memory of the computer device after the encrypted key has been generated and stored.

4. A method as claimed in claim 1 and comprising sending the rendered encryption key to a service provider.

5. A method as claimed in claim 1, further comprising generating a checksum from the encryption key and storing the checksum on the computer device for later use in verifying an entered rendered encryption key.

6. A method of accessing encrypted information stored on a computer device, the method comprising:
   entering an encryption key into the computer device, the key being rendered in a form comprising a reduced length sequence of characters;
   decoding the rendered encryption key to generate a binary encryption key; and
   unencrypting the encrypted information using the binary encryption key.

7. A method as claimed in claim 6, wherein the rendered encryption key is entered into the computer device using a keypad of the device.

8. A method as claimed in claim 6, wherein the rendered encryption key is entered into the device by way of a text message received from a service provider.

9. A method as claimed in claim 6 and comprising verifying the encryption key prior to unencrypting the encrypted information by generating a checksum from said binary encryption key and comparing said checksum with a checksum stored on the computer device.

10. A method of enabling a user of a computer device to back-up an encryption key generated on the device, the method comprising rendering the key into a form comprising a reduced length sequence of characters and sending the reduced length sequence to a service provider.

11. A method according to claim 10 and comprising sending the rendered key to the service provider using a text messaging service of a mobile telecommunications network.

12. A method according to claim 10 and comprising sending the rendered key to the service provider by means of voice dictation.

13. A method according to claim 10 and comprising connecting the computer device to a WAP or www page maintained by the service provider to enable the user to provide identification information to the service provider.

14. A computer device arranged to perform the method of claim 1.

15. A computer device according to claim 14, the computer device being a mobile wireless terminal.

16. A computer storage medium having encoded thereon a computer program for causing a computer device to:
   render an encryption key into a form comprising a reduced length sequence of characters; and
   display the reduced length sequence on a display of the device.

17. A computer storage medium having encoded thereon a computer program for causing a computer device to:
   render an encryption key into a form comprising a reduced length sequence of characters; and
   send the reduced length sequence to a service provider.

* * * * *